United States Patent

Lyon et al.

[11] 4,009,083
[45] Feb. 22, 1977

[54] REGENERATION OF LIQUID DESICCANTS AND ACID GAS ABSORBING LIQUID DESICCANTS

[75] Inventors: George W. Lyon, Midland, Mich.; Roscoe L. Pearce, Lake Jackson, Tex.

[73] Assignee: The Dow Chemical Company, Midland, Mich.

[22] Filed: June 23, 1975

[21] Appl. No.: 589,225

Related U.S. Application Data

[63] Continuation-in-part of Ser. No. 177,414, Sept. 2, 1971, abandoned.

[52] U.S. Cl. .................................. 203/49; 55/32; 159/DIG. 33
[51] Int. Cl.² ............................ B01D 3/34; B01D 53/02
[58] Field of Search ........ 55/32, 42; 203/14, 17–19, 203/49; 159/31, 16 R, 16 S, DIG. 33

[56] References Cited
UNITED STATES PATENTS

| | | | |
|---|---|---|---|
| 2,529,622 | 11/1950 | Michael | 203/17 X |
| 2,603,311 | 7/1952 | Frazier | 55/32 |
| 3,321,890 | 5/1967 | Barnhart | 55/32 |
| 3,349,544 | 10/1967 | Arnold et al. | 55/32 |
| 3,471,370 | 10/1969 | Jubin, Jr. | 203/49 |
| 3,589,104 | 6/1971 | Panzarella | 55/32 |
| 3,658,656 | 4/1972 | Adica et al. | 203/49 |

*Primary Examiner*—Jack Sofer
*Attorney, Agent, or Firm*—Glwynn R. Baker

[57] ABSTRACT

This invention relates to the low temperature regeneration of liquid desiccants and acid gas absorbing liquid desiccants. Both classes of desiccants can be regenerated to separate water and/or water and acid gases to a satifactory degree under the pressure conditions employed at temperatures substantially below the normal boiling point of the dry desiccant or desiccant-water mixture by countercurrently contacting the desiccant to be regenerated in conventional distillation equipment with the vapors of an easily condensable hydrocarbon or hydrocarbon mixture which is substantially immiscible with the regenerated desiccant at the boiling temperature of the hydrocarbon or hydrocarbon mixture employed as a stripping agent.

25 Claims, 1 Drawing Figure

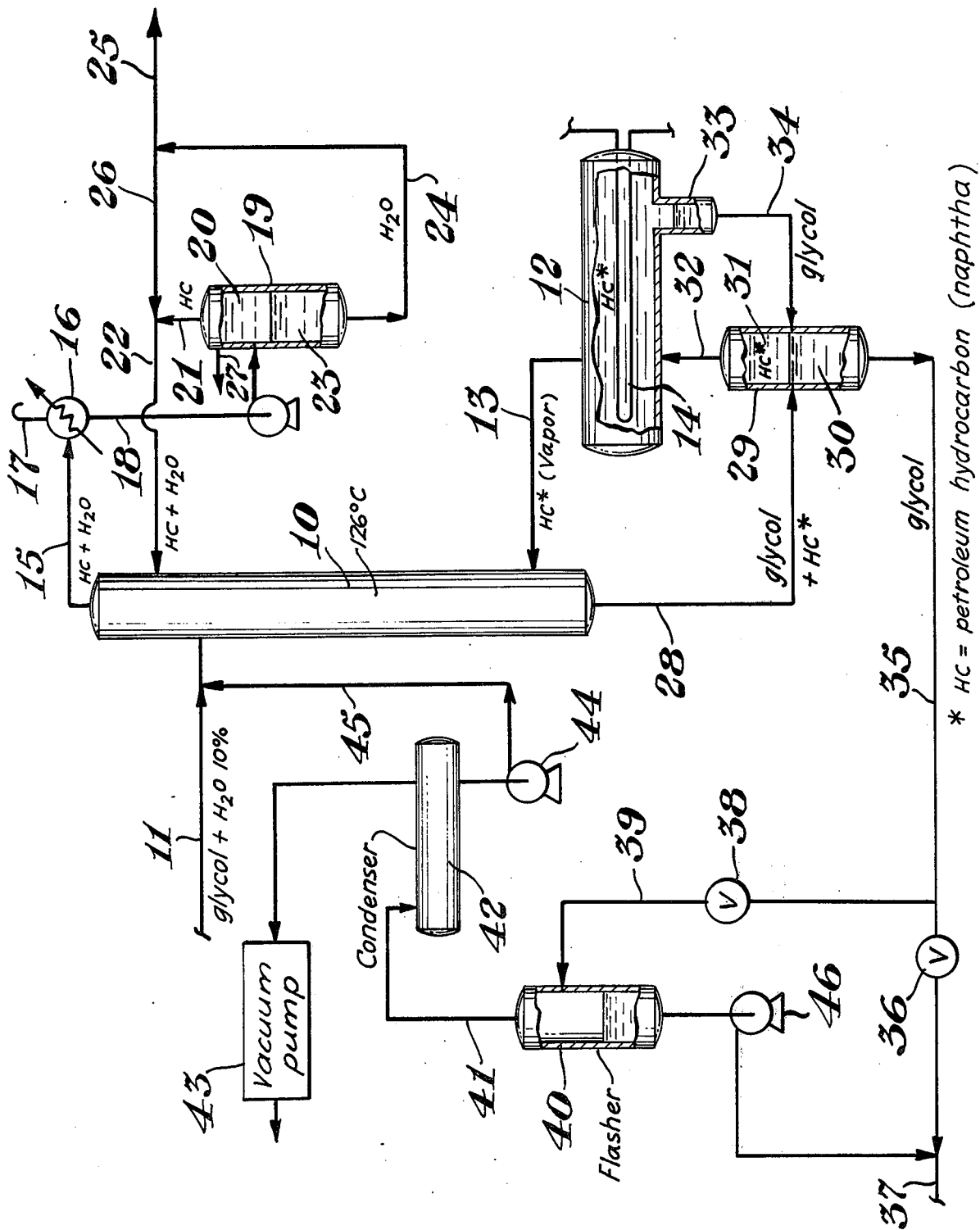

REGENERATION OF LIQUID DESICCANTS AND ACID GAS ABSORBING LIQUID DESICCANTS

CROSS-REFERENCE TO PRIOR APPLICATION

This application is a continuation-in-part of our application Ser. No. 177,414, filed Sept. 2, 1971, now abandoned.

BACKGROUND OF THE INVENTION

The processing of industrial gases, such as normally gaseous hydrocarbons and hydrogen, typically requires the separation of both acid-gas constituents and water prior to subsequent processing or distribution.

Acid gas constituents, such as $CO_2$ and $H_2S$, are quite commonly removed from industrial gases by countercurrent absorption with an aqueous solution of an acid gas absorbent. The acid gas absorbent solution is typically regenerated by distillation to remove the absorbed acid gases and recycled to the absorption step. The acid free (sweetened) product gas is subsequently dried in a separate operation.

Hygroscopic liquids are widely used for drying numerous industrial gases, by passing the comparatively dry, liquid hygroscopic desiccant through a column in a direction counter to the flow of the gas. Dry gas is usually removed from the top of the column, while the rich liquid desiccant, containing the absorbed water, is removed from the bottom of the column and sent to a regenerating unit where the rich desiccant is heated to remove as much absorbed water as possible without excessively decomposing the desiccant. The so regenerated liquid desiccant is then recycled to the gas drying column.

The hygroscopic nature of the desiccants serve well for absorption of water, however, there are problems in their regeneration. With heat alone, a temperature approaching the boiling point of the desiccant, which frequently exceeds the decomposition range of the liquid desiccant, is needed to reduce the moisture content to a level satisfactory for the intended desiccant application. More serious, however, are the effects of direct contact of the desiccant with hot surfaces of a heat exchanger. It is known that excessive heat fluxes on such surfaces contribute greatly to break-down of the desiccants.

Previous attempts at solving the problems have not been entirely satisfactory.

In one process, shown in U.S. Pat. No. 3,105,748, an aliquot of dried natural gas is heated to 325°–365° F in a gas-fired heater. This temperature is slightly below the decomposition point of a glycol moisture absorbent. The heated gas is passed through a hot glycol maintained at about the temperature indicated above. The gas used for stripping moisture from the glycol is vented or flared. Thus, this process is wasteful of gas and requires careful control to avoid loss of glycol through decomposition by contact with hot surfaces in the reboiler. In addition, the vented or flared gas contributes to air pollution.

In another procedure, described in U.S. Pat. No. 3,349,544, an azeotroping agent is introduced below the surface of a liquid desiccant in a heated regeneration zone, wile maintaining the temperature in the regenerating zone above the vaporization temperature of the azeotroping agent. The azeotropic mixture is condensed, water and azeotroping agent are separated and the azeotroping agent is recycled. In this process the moisture content of the desiccant cannot be reduced below that consistent with water contained in the azeotroping agent. It also exposes the desiccant to hot surfaces.

In a process described in U.S. Pat. No. 3,471,370, naptha and a glycol-amine desiccant-acid gas absorbent are fed to a reboiler, situated externally of a stripping column, into which a moist glycol-amine is fed. The temperature of the reboiler is maintained at 300°–400° F. In the reboiler, all the naphtha, except that which may remain in solution in the absorbent at the high temperature, is flashed and the vapors are passed through the moisture stripping zone to dry the glycol-amine mixture to a moisture content of about 1.6 to 1.8 percent. In this procedure, the moisture content of the desiccant cannot be reduced below that consistent with the water content of the naphta. It also has the shortcoming of exposure of the desiccant to hot surfaces.

A further shortcoming of the prior processes is that very high boiling desiccants, such as tetraethylene glycol, higher boiling glycols or other polyols or alkanolamines cannot be employed in continuous gas drying processes, because of excessive decomposition at temperatures necessary to liberate water.

SUMMARY OF THE INVENTION

In this application the terms "liquid desiccant" and "liquid absorbent" are used interchangeably and mean liquid hydroscopic materials which are employed for either drying industrial gases which contain water, but are normally free of acid gas constituents, or which contain both water and acid gases. When the industrial gas contains no acid gas, certain polyols or glycols can constitute the "liquid desiccant" or "liquid absorbent". If acid gases, representatives of which are $H_2S$, low molecular weight mercaptans, namely, up to about 6 carbon atoms, $CO_2$, COS or $CS_2$, are present their content must be reduced along with the moisture, the "liquid desiccant" or "liquid absorbent" usually contains a liquid alkanolamine or a liquid physical acid gas absorbent. Certain of the liquid alkanolamines function as both water and acid gas absorbents. The types of liquid desiccants or liquid absorbents useful for either drying alone, or both drying and sweetening (e.g., reduction in acid gas content) are described in detail hereinafter.

Liquid glycols will dissolve acid gases such as $H_2S$ and $SO_2$ to some degree at low temperatures, e.g. below 100° F and atmospheric pressure. They will also dissolve some $CO_2$ at low temperatures at superatmospheric pressures. However, the glycols when used as desiccants are usually employed to absorb water and only small amounts of acid gases.

An object of this invention is a process for drying liquid absorbents without exposure to surfaces which are heated to high temperatures.

Another object is a process for regenerating liquid desiccants and/or acid gas absorbents in which the sole source of heat for evaporating moisture is supplied by vapor used as the water and/or gas stripping agent.

Another object is the process above in which a hydrocarbon vapor is passed through the desiccant.

Another object is a process of drying and/or stripping acid gas from a liquid desiccant to a water content well below that possible at the same temperature by conventional distillation processes.

The process of this invention comprises vaporizing a normally liquid hydrocarbon water and/or gas stripping agent, either aliphatic or aromtic, or mixtures thereof, which is substantially insoluble in the dried absorbent and in water, and which has a boiling temperature below the upper critical solution temperature of the mixture and above the lower critical solution temperature, if such exists, of the dried absorbent and stripping agent, passing the vapors upwardly through a rich or wet liquid absorbent, condensing the vapors from the regenerator in an area out of direct contact with the absorbent, separating the liquid hydrocarbon from water, and repeating the cycle without subjecting the absorbent to any heat other than that supplied by the vapor. Preferably, the solubility of the hydrocarbon in the liquid absorbent should not exceed about 5–10 percent. During the stripping step, the temperature of the system will be below the upper critical solution temperature and above the lower critical solution temperature, if the mixture has two critical solution temperatures, of the stripping agent and the dry desiccant and will not exceed the boiling temperature of the hydrocarbon or hydrocarbon mixture at the prevailing pressure. The stripping agent, preferably, is one which, in liquid state, is substantially immiscible or only slightly miscible with the liquid desiccant and with water, so that two separate liquid phases can be separated when the temperature is different from the critical solution temperatures. Thus, effluent from the base of a regeneration unit, or distillation column, is fed to a second separating zone where two liquid phases are present. The dried desiccant is separated from the liquid hydrocarbon stripping agent and the latter is vaporized and passed through the regeneration zone.

In one modification for producing a desiccant containing from 1 to about 5000 ppm water in the regenerated desiccant, a portion of the overhead condensate can be returned to the regeneration column as reflux, if desired, while the remainder is sent to a separator where a liquid hydrocarbon and a water phase are formed. The water phase is sent to a disposal train and at least a portion or all of the liquid hydrocarbon is returned to the regenerator as a reflux stream. In another modification, rich desiccant and hydrocarbon stripping agent are fed to the regeneration zone, and after phase separation of the effluent and stripping of the desiccant, the hydrocarbon from the overhead condensate is withdrawn without returning any as reflux.

In a third modification, where the liquid hydrocarbon is partially soluble in the desiccant and a desiccant having only very small quantities of liquid hydrocarbon is desired, the dried desiccant is passed from the separation zone through an evacuated flash drum. The stripping agent is vaporized and then condensed and can be recycled to the regenerator.

In practicing the invention, the rich or wet liquid desiccant preferably enters a regeneration column somewhat below the top, but it can also be fed directly into the top of the column. The vaporized liquid hydrocarbon if fed to the regeneration column near or at its bottom as in a normal distillation. The temperature of the hydrocarbon will be at or slightly below its boiling point under the pressure conditions employed in the regeneration. In the stripping or desiccant regeneration zone, intimate countercurrent contact of the vapors is obtained with both the desiccant and the hydrocarbon which are simultaneously undergoing drying. This contacting can be effected by known means, commonly used in distillation practice, such as by the use of packings, trays or other vapor liquid contacting devices.

The vaporizing unit for the hydrocarbon or stripping agent is preferably separated from the regeneration column (as shown in the drawing) to effect vaporization out of contact with the desiccant. A vaporizing unit can be provided for in the bottom of the regeneration column by proper level control of the liquid and by proper placement of heating elements to assure that only the hydrocarbon is contacted directly by the heat source used for vaporizing.

The regeneration can be carried out under vacuum, at atmospheric pressure or under superimposed pressure.

There is no limitation imposed by the boiling point of the desiccating liquid which can be dried or regenerated by this process. It is necessary only that the liquid hydrocarbon, or stripping agent, have a normal boiling point, preferably, above about 65° C and below the decomposition temperature of the desiccant, be stable at its boiling point, be non-reactive with water and the desiccant, and be sufficiently immiscible with water and the desiccating liquid to form two liquid phases, one in the overhead condensate and one in the bottom effluent from the regeneration unit.

BRIEF DESCRIPTION OF THE DRAWING

The drawing is a schematic description of the process. A wet or rich absorbing solution enters the upper portion of regeneration column 10, through line 11. Column 10 can be a packed column, a bubble plate, baffle plate, sieve plate column, or other vapor-liquid contacting device. The wet desiccant flows downwardly by gravity. A normally liquid hydrocarbon or stripping agent is vaporized in reboiler 12 and passes through line 13, into the lower portion of column 10. Reboiler 12 has a heating element 14, in this instance a coil, for passage of steam or other fluid heating medium from a source not shown. It is understood, however, that any other source of heat such as electrical resistance heating, direct flame heating, or circulation of a heat exchange medium other than steam can also be used. The vapors of the hydrocarbon flow upwardly in column 10 and serve to heat the downflowing desiccant to a temperature approaching the boiling temperature of the hydrocarbon vapor under the pressure conditions employed. This temperature is also below upper critical solution temperature of the hydrocarbon-desiccant mixture and above the lower critical solution temperature of the mixture, if such exists. A mixture of water and hydrocarbon, or stripping agent, vapors passes out of the top of column 10, through line 15, into a condenser 16, shown here with an atmospheric vent 17. The condensate passes through line 18 to separator 19. In the separator two liquid phases or layers are formed. The hydrocarbon layer 20 passes through line 21 to line 22, which returns it to the upper portion of column 10. If desired, the hydrocarbon can be withdrawn from separator 19 through line 27, without returning to column 10 as reflux. In some instances wherein the water solubility in the hydrocarbon is low, e.g., $C_6$–$C_{10}$ aliphatic hydrocarbons, both straight-chain and branched, the hydrocarbon or a portion thereof can be returned to the reboiler 12 for recycle via a line which is not shown. The water layer 23 passes through line 24. A portion of the water is sent to a disposal system through line 25 and, if needed, a portion is fed to line 22 through line 26 to add small amounts of water to the hydrocarbon reflux to suppress desiccant losses.

The desiccant from which a large portion of water has been removed and the hydrocarbon, which is in liquid form, pass from the bottom of column 10 to line 28, directly into a second separator 29, where the desiccant 30 and hydrocarbon 31 separate to form two liquid phases. From separator 29, the hydrocarbon phase 31 passes through line 32 into reboiler 12, where it is vaporized and recycled through the column. Reboiler 12 can contain a sump 33 where small amounts of desiccant carried to the reboiler in solution in the hydrocarbon can be collected and returned to separator 29 through line 34. In some instances it may be desirable to place a heat exchanger (not shown) between the bottom outlet of column 10 and separator 29, to maintain temperature conditions which assure separation of phases.

The dried desiccant passes through line 35 and normally through valve 36 into line 37 for recycle through a gas drying unit. If it is desired to reduce the hydrocarbon content of the desiccant, valve 36 is completely or partially closed and valve 38 in line 39 is opened partially or completely. In this manner, some or all of the dried desiccant passes into flash drum 40, which is connected by line 41 to a condenser 42 equipped with a vacuum source 43. Condensed hydrocarbon and desiccant leave the condenser by means of pump 44 thru line 45 where the condensate is recycled, preferably, to the feed stream 11. The desiccant after flashing is pumped from the flash drum 40 by means of pump 46 to line 37 for recycle to the gas drying step.

DESCRIPTION OF THE INVENTION

The liquid desiccant can be any liquid hygroscopic material. Representative desiccants include polyols alone or in mixture. Typical of these are ethylene glycol, propylene glycols, butylene glycols, pentylene glycols, glycerol, trimethylol propane, diethylene glycol, triethylene glycol, tetraethylene glycol, dipropylene glycol, tripropylene glycol, tetrapropylene glycol and mixtures thereof. These glycols contain from 2 to 12 carbon atoms.

Polyol compounds which are normally solid, but which are soluble in substantially anhydrous liquid polyols or liquid hydroxyl amines, can also be included. Typical representatives of such solids are erythritol, sorbitol, pentaerythritol, and the low molecular weight sugars. Typical alkanolamines include monoethanolamine, diethanolamine, triethanolamine, isopropanolamine, including mono, di and tri, isopropanolamine or diglycolamine. The alkanolamines can contain from 2 to about 9 carbon atoms.

Other desiccants and/or acid gas absorbents include N-methyl pyrrolidone and alkyl substituted derivatives thereof, sulfolane (tetramethylenesulfoxide) and alkyl substituted derivatives thereof. Mixtures of any of the above desiccants can be used in any proportion. The alkanolamines, N-methyl pyrrolidone and sulfolane are also useful as acid gas absorbents. The N-methyl pyrrolidones and sulfolanes are particularly useful for such purpose when mixed with an alkanolamine, with or without glycol.

Liquid aliphatic hydrocarbons, or stripping agents, can include liquid hydrocarbons including alkanes, cycloalkanes, alkenes, cycloalkenes with normal boiling points in the range of 65° to 235° C. The hydrocarbons can be pure components or mixtures of pure components, or a suitable petroleum fraction such as naphtha. The boiling point of the hydrocarbon should not exceed the decomposition temperature of the least stable compound in the desiccant. This temperature is about 300° F for monoethanolamine and about 350° F for diethanolamine. The liquid glycols usually evidence some decomposition if held at their atmospheric boiling points. This composition can be accelerated by the presence of oxygen or by contact with certain metals.

Representative hydrocarbons include the straight and branched chain monoalkenes and alkanes having 6–7 carbon atoms, the 8 carbon atom monoalkenes and alkanes, the 9 carbon atom monoalkenes and alkanes, the 10 carbon atom monoalkenes and alkanes and mixtures thereof, all with a normal boiling point of 65° C or higher. Representative aromatic hydrocarbons include benzene, toluene, xylene, ethyl benzene, cumene, butylbenzenes, diethylbenzenes, triethylbenzenes, and the like. The aromatic hydrocarbons having a boiling range of 80° to about 235° C. Mixtures of aliphatic and aromatic hydrocarbons can be used. If any of the above alkenes tend to homopolymerize or copolymerize, a small amount of a known polymerization inhibitor can be added. Preferably the inhibitor will be sufficiently volatile to inhibit polymerization in both the liquid and vapor phases.

Regardless of pressure, temperatures in the regeneration column should be maintained below the decomposition point of the specific desiccant or absorbent being regenerated. Thus, where triethylene glycol is the desiccant and an aliphatic hydrocarbon, such as n-octane, is the stripping agent, a temperature of 204°–235° C at 87–100 psia is operable. If a mixture of triethylene glycol and diethanolamine is the desiccant and n-octane the stripping agent, a temperature of about 135° C–150° C should not be exceeded regardless of the hydrocarbon employed. This corresponds to a pressure of about 18.5 psia for n-octane at 135° C. The pressure at the head of the regeneration column is preferably slightly above atmospheric, i.e., autogenous, but it can range as high as 350 psia.

GENERAL PROCEDURE

A water-rich feed containing commercial grades of glycol, alkanolamines or other desiccant and about 10 weight parts of water was placed in a measuring device and fed at about a constant rate to a 4 foot by 3 inch inner diameter column packed with Intalox saddles. Unless otherwise stated in the following examples, approximately three liters of hydrocarbon stripping agent were loaded into a reboiler of about five liters capacity and brought to its boiling temperature by external electrical heating means. After the hydrocarbon vapors started to liquefy in the overhead condenser, the water-rich desiccant was introduced at the top of the column, and the boiling rate of the hydrocarbon was adjusted to maintain a desired head temperature at the top of the column. About four hours were permitted to insure that steady state conditions were attained.

Vapors from the column consisted essentially of water and hydrocarbon. These were condensed and passed to the hydrocarbon-water separator. The water condensate was sent to a graduated measuring cylinder and the liquid hydrocarbon phase was returned to the top of the column with the water-wet desiccant feed.

The volume of water collected was recorded and the average volume recovered per hour was calculated.

Two phase lean or dried desiccant-hydrocarbon mixture leaving the bottom of the column passed to a desiccant-hydrocarbon separator. The desiccant was pumped from the separator at a controlled rate to maintain a nearly constant desiccant-hydrocarbon interface position. The hydrocarbon was returned to the reboiler and vaporized. When liquid aliphatic hydrocarbons are used as the stripping agent, their solubility in the desiccant is quite low, and the regenerated or dried desiccant from the bottom of the column can be recycled back to the water absorption step. Aromatic hydrocarbons are somewhat more soluble in the desiccant and their removal therefrom may be desirable in some cases. If so, the vacuum flash system heretofore described can be used advantageously. The examples described below were all run without drawing any vacuum or any superimposed pressure, i.e., under autogenous pressure of the system. Parts and percentages are by weight unless otherwise specified. The examples are intended to illustrate but not to limit the invention.

EXAMPLE 1

A mixture of 90 weight percent triethylene glycol and 10 weight percent water was fed to the top of the column, at an average rate of 789 ml. per hour. Vapors of n-octane from the reboiler were fed near the base of the column. The temperature of the boiling n-octane was 129.5° C. Mid-column temperature was 126° C and the head temperature was 109.5° C. Vapors leaving the top of the column entered a water-cooled condenser and condensate flowed to a separator where an aqueous and a hydrocarbon layer were formed. Water was continuously removed as overflow from the separator. The condensed hydrocarbon was returned to the top of the column. During the run the water was collected in a graduated cylinder at an average rate of about 81.8 ml. per hour. Analysis of the dried triethylene glycol sampled each two hours showed a range of 0.22 percent to 0.34 percent by weight with an average of 0.28 percent in eight samplings.

Published data indicate that a temperature of about 260° C would be needed to reduce the water content of triethylene glycol to a level of 0.28 percent by conventional atmospheric distillation.

EXAMPLE 2

A series of runs in the above described column was made in which head temperature was controlled, either by increasing the vapor rate or decreasing the quantity of wet glycol feed. The latter was a mixture of 90 weight percent triethylene glycol and 10 percent water. The water stripping agent was n-octane. Feed rates and water collected are hourly averages in milliliters. Data taken during these tests are tabulated below:

| Wet Glycol Feed Rate | Water Collected | Temperature ° C | | | % Water In Dried Glycol |
|---|---|---|---|---|---|
| | | Reboiler | Mid-Col. | Head | |
| 806.3 | 87.2 | 129.0 | 125 | 110 | 0.54 |
| 787.5 | 89.2 | 129.5 | 126 | 120 | 0.46 |
| 391.7 | 47.3 | 129.0 | 127 | 121.8 | 0.27 |

The water content was an average of two samplings, each taken after a two hour period.

These data show that as head temperature increases the amount of water in the dried desiccant is decreased.

EXAMPLE 3

The stripping agent in this instance was a straight run, essentially non-aromatic petroleum naphtha, with a 70.8 API gravity and an 88° to 312° F ASTM boiling range. Lights boiling up to 75° C were removed from the petroleum fraction before use. The source of the naphtha was a mixture of 80 percent Canadian and 20 percent Michigan crude oil.

The wet desiccant feed was a mixture of 90 weight percent triethylene glycol and 10 weight percent water. The feed of the water-glycol to the column averaged 765.6 ml. per hour. Water was collected at an average rate of about 88.8 ml. per hour. The temperature of the reboiled vapors ranged from 150°–170° C, the mid-column temperature ranged from 112°–140° C, and the head temperature was nearly constant at 81.5° C. After drying, the triethylene glycol contained 0.56° water by weight, with a range in four samples of 0.46 to 0.64 percent.

EXAMPLE 4

In this example the drying of triethylene glycol with a continuously supplied fresh hydrocarbon mixture is demonstrated. The water stripping agent in this example was heavy naphtha, i.e., a naphthenic reformer feed cut obtained from an 80 percent Canadian 20 percent Michigan crude oil mixture, had an API gravity of 52.3 and an ASTM boiling range of 204° to 356° F.

The heavy naphtha was fed through the top of the column along with the 10 percent water - 90 percent weight triethylene glycol. Hydrocarbon collected in the overhead separator was discarded until equilibrium conditions were reached. When steady temperatures in various portions of the column were reached, the naphtha feed was stopped and the hydrocarbon from the overhead separator was recycled through a separate feed system. In this manner the continuous naphtha feed was simulated.

The temperature of the naphtha in the reboiler was 170° C, and the mid-column temperature was 161° C, and the head temperature was 129° C. Five samples of the dried triethylene glycol showed a water content ranging from 0.015 to 0.116 percent by weight averaging 0.074 percent.

If the 10 percent water - 90 percent triethylene glycol feed mixture had been distilled at atmospheric pressure in a conventional distillation process, the reboiler temperature of the triethylene glycol required to produce a product containing 0.074 percent water - 99.926 percent triethylene glycol is estimated to be 281° C which is 111° C higher than the 129° C temperature demonstrated in these examples. The 281° C temperature is about 70° to 80° C higher than the thermal decomposition temperature for triethylene glycol.

EXAMPLE 5

In this example a 90 weight percent mixture of triethylene glycol and 10 percent of water was fed to the column at an average rate of 781.3 ml. per hour. The stripping agent consisted of a mixture of about 250 ml. benzene and 3000 ml. n-octane. The temperature of the boiling hydrocarbon was 127.0° C, the mid-column temperature ranged from 98° to 105° C, and the head temperature was 75.5° C. Water was collected at a rate of about 92.0 ml. per hour. The dried desiccant contained 0.11 percent water by weight.

EXAMPLE 6

A 10 weight percent water and 90 weight percent diethanolamine solution was fed to the column at an average rate of 787.5 ml. per hour. The stripping agent was n-octane (b.p. 129.4° C). The mid-column temperature was 125° C and the head temperature was 108.8° C. Four samples of the dried alkanolamine contained a range of 0.76 to 0.85 percent water, with an average of 0.83 percent in four samples. It is estimated that a temperature of 238° C would be required to obtain comparable dryness by atmospheric distillation of the alkanolamine.

EXAMPLE 7

This example shows that both $CO_2$ and water can be stripped from an aqueous alkanolamine by this process with n-octane as the stripping hydrocarbon. A feed consisting of 83.7 percent by weight of diethanolamine, 9.3 percent water and 7.0 percent of $CO_2$ (about 0.2 mole $CO_2$ per mole of amine) was added to the column at an average rate of 756.3 ml. per hour. The water collected averaged 71.1 ml. per hour. The temperature of the reboiler liquid was 129.6° C, the mid-column temperature was 124° C, and the head temperature was 104.6° C. The amine in the bottoms from the column contained an average of only 0.011 mole $CO_2$ mole of alkanolamine and 1.96 percent water. An estimated temperature of 202° C would be required to attain comparably dry amine by atmospheric distillation.

EXAMPLE 8

A mixture of 72 weight percent of triethylene glycol, 18 percent diethanolamine and 10 percent water was fed to the column at an average of 771.9 ml. per hour. Water was collected in the overhead separator at an average of 78.6 ml. per hour. The temperatures about the column, using n-octane as the stripping agent, were 127° C in the reboiler, 115° C at the mid-column, and the head temperature was 100° C. The dried mixture from the column bottom contained 0.47 percent water.

EXAMPLE 9

A mixture of 90 weight percent diethanolamine and 10 percent water was fed to the column at an average rate of 787.5 ml. per hour. Water was collected in the overhead separator at an average of 85.4 ml. per hour. The hydrocarbon stripping agent was xylene. The temperature in the reboiler was 136° C, mid-column temperature was 134° C, and the head temperature was 120° C. The diethanolamine was found to contain 0.04 weight percent water and about 8.23 weight percent of hydrocarbon. As indicated, heretofore, if a substantially hydrocarbon-free diethanolamine is desired for recycle to the absorbing step, the diethanolamine can be passed through a flash drum where the hydrocarbon is flashed, thus minimizing the amount of hydrocarbon in the dry diethanolamine for recycle to the absorber.

EXAMPLE 10

This example shows that $H_2S$ and water can be stripped from a liquid desiccant-acid gas absorber by the process of this invention.

A mixture of 87.5 weight percent diethanolamine, 9.7 percent water, and 2.8 percent $H_2S$ was fed to the column at an average rate of 803.6 ml. per hour. Water was collected in the overhead separator at an average of 85.3 ml. per hour. The hydrocarbon stripping agent was n-octane. Temperatures in the reboiler, mid-column and at the head of the column were 132° C, 127° C, and 115° C, respectively. The diethanolamine phase from the bottom of the column contained 0.64 weight percent water and 0.0125 percent $H_2S$.

In all instances the water content of the dried desiccant was determined by the Fisher method.

Any of the glycols, alkanolamines, N-alkyl pyrrolidone or sulfolane desiccants mentioned above, alone or in admixture, can be dried by the process of the invention.

In addition to water, the desiccants which react reversibly with, or physically absorb acid gases, can be both dried and stripped of the acid gas by the procedures exemplified above.

Any hydrocarbon which is not appreciably miscible with the desiccating agent can be used for stripping the water and acid gas from a water and/or acid gas rich desiccant.

We claim:

1. In a method of regenerating liquid desiccants or acid gas absorbing liquid desiccants or mixtures thereof, the steps comprising, feeding a rich liquid absorbent into an upper portion of a regeneration column, vaporizing by heat a normally liquid hydrocarbon or mixture of hydrocarbons substantially insoluble in the dried desiccant and in water, which hydrocarbon has a boiling temperature below the upper and above the lower critical solution temperatures of the mixture of the desiccant and the said hydrocarbon under the pressure conditions employed, passing the vapors upwardly through the rich liquid absorbent, said vapors being the sole source of heat added for regeneration of the desiccant, condensing overhead vapors from the regenerator out of direct contact with the rich liquid absorbent, separating liquid hydrocarbon from water, and returning at least a portion of the overhead hydrocarbon condensate to the regeneration column as reflux, passing a two phase liquid mixture from the regenerator into a separator to form a lean desiccant phase and a liquid hydrocarbon phase, passing the hydrocarbon phase into a vaporizer wherein the hydrocarbon phase is heated and vaporized for recycle to the regenerator, and removing the lean desiccant phase from the separator.

2. The method of claim 1 in which the hydrocarbon is n-octane.

3. The method of claim 1 in which the hydrocarbon is a light naphtha.

4. The method of claim 1 in which the hydrocarbon is a heavy naphtha.

5. The method of claim 1 in which the absorbent is a glycol.

6. The method of claim 1 in which the absorbent is diglycolamine.

7. The method of claim 1 in which the absorbent is diethanolamine.

8. The method of claim 1 in which the hydrocarbon is aliphatic and boils in a range of from about 65° C to about 235° C at atmospheric pressure but not in excess of the decomposition temperature of the least stable compound in the desiccant.

9. The method of claim 8 in which the absorbent contains N-methyl pyrrolidone.

10. The method of claim 8 in which the absorbent contains sulfolane.

11. The method of claim 8 in which the glycol contains from 2 to 12 carbon atoms.

12. The method of claim 11 in which the glycol is triethylene glycol.

13. The method of claim 1 in which the hydrocarbon is aromatic having a boiling range of 80° to 235° C.

14. The method of claim 13 in which the hydrocarbon is xylene.

15. The method of claim 13 in which the hydrocarbon is toluene.

16. The method of claim 13 in which the hydrocarbon is benzene.

17. The method of claim 1 in which the hydrocarbon is a mixture of aliphatic and aromatic hydrocarbons.

18. The method of claim 17 in which the mixture is n-octane and benzene.

19. The method of claim 1 in which the absorbent is a mixture of a glycol of 2–12 carbon atoms and an alkanolamine having from 2 to 9 carbon atoms.

20. The method of claim 19 in which the glycol is triethylene glycol and the alkanolamine is diethanolamine.

21. The method of claim 19 in which the absorbent undergoing regeneration is an alkanolamine-acid gas mixture, in which the acid gas is at least one of $CO_2$, $H_2S$, low molecular weight mercaptans, COS, or $CS_2$.

22. The method of claim 21 in which the absorbed acid gas is $CO_2$.

23. The method of claim 21 in which the absorbed acid gas is $H_2S$.

24. The method of claim 1 in which the pressure of regeneration ranges from autogenous to about 350 psia.

25. The method of claim 24 in which the regeneration pressure is autogenous.

* * * * *

UNITED STATES PATENT AND TRADEMARK OFFICE
CERTIFICATE OF CORRECTION

PATENT NO. : 4,009,083

DATED : February 22, 1977

INVENTOR(S) : George W. Lyon and Roscoe L. Pearce

It is certified that error appears in the above-identified patent and that said Letters Patent are hereby corrected as shown below:

Col. 2, line 17, delete "naphta" and insert -- naphtha --

Col. 3, line 58, delete "if" and insert -- is --

Col. 6, line 17, delete "having" and insert -- have --

Col. 8, line 41, delete "and" following "170°C,"

Col. 9, line 27, after "$CO_2$" insert -- per --

*Signed and Sealed this*

*fifth* Day of *July 1977*

[SEAL]

Attest:

RUTH C. MASON
*Attesting Officer*

C. MARSHALL DANN
*Commissioner of Patents and Trademarks*